United States Patent [19]

Bellmer et al.

[11] Patent Number: 4,799,874
[45] Date of Patent: Jan. 24, 1989

[54] EXTRUSION HEAD

[75] Inventors: Klaus Bellmer, Ronnenberg; Gerd Capelle, Langenhagen, both of Fed. Rep. of Germany

[73] Assignee: Hermann Berstorff Maschinenbau GmbH, Hanover, Fed. Rep. of Germany

[21] Appl. No.: 116,885

[22] Filed: Nov. 5, 1987

[30] Foreign Application Priority Data

Nov. 12, 1986 [DE] Fed. Rep. of Germany ....... 3638623

[51] Int. Cl.$^4$ .......................... B29F 3/04; B29C 47/12
[52] U.S. Cl. ............................... 425/131.1; 425/133.5; 425/190; 425/192 R; 425/462; 425/466
[58] Field of Search ........................... 264/171, 177.16; 425/130, 131.1, 133.5, 190, 192 R, 595, 589, 592, 462, 466

[56] References Cited

U.S. PATENT DOCUMENTS 4,548,568 10/1985 Herbert et al. .................. 425/131.1
4,666,392 5/1987 Gerloff et al. .................. 425/131.1

FOREIGN PATENT DOCUMENTS 3212157 10/1983 Fed. Rep. of Germany .

Primary Examiner—Jay H. Woo
Assistant Examiner—Timothy W. Heitbrink
Attorney, Agent, or Firm—Foley & Lardner, Schwartz, Jeffery, Schwaab, Mack, Blumenthal & Evans

[57] ABSTRACT

An extrusion head suitable for producing tread strips for automotive vehicle tires from a plurality of rubber mixtures comprising a central head portion, upper and lower head portions disposed one on each side of said central head portion, said upper head portion and said central head portion and said lower head portion and said central head portion jointly defining at least two flow channels therebetween said flow channels being disposed above one another in a vertical plane, hydraulic means for pivoting each of said upper and lower head portions relative to said central head portion, said upper and lower head portions each including lateral portions extending substantially parallel to the direction of flow of said rubber mixtures through said head, hydraulically actuated locking means mounted on each said lateral portion and displaceable laterally outwardly in a direction substantially at right angles to said direction of flow, said locking means including locking members engageable with each said lateral portion and a locking arrangement for high-pressure locking of said upper and lower head portions disposed on each lateral side of said head for each of said upper and lower head portions, wherein said locking members are cylindrical and said locking arrangement includes tensioning link members, each said tensioning link member defining a recess for receiving one said cylindrical locking member, and common pivot point means for pivotally mounting said locking arrangement for said upper head portion and said locking arrangement for said lower head portion disposed on the same lateral side of said head.

4 Claims, 4 Drawing Sheets

EXTRUSION HEAD

The present invention relates to an extrusion head and, more particularly, to an extrusion head of a type which is suitable for producing tread strips for motor vehicle tires from a plurality of rubber mixtures.

BACKGROUND OF THE INVENTION AND PRIOR ART DISCUSSION

Extrusion apparatuses including extrusion heads for producing tread strips for motor vehicle tires are known. One such arrangement is disclosed in German Patent Specification No. 3212157. Such an arrangement comprises an extrusion head having a fixed central portion and upper and lower portions which are mounted so as to be pivotable towards and away from the central head portion. Flow channels for the mixtures being used to form the tread strip are defined between the central head portion and upper and lower head portions respectively. The arrangment further includes locking members which are hydraulically actuated. These locking members project laterally outwardly, at right angles to the direction of flow of the mixture through the head, and engage in lateral portions of the head. A further locking system is also provided to provide high-pressure sealing of the upper and lower head portions respectively against the central portion.

Such an extrusion apparatus is used to produce flat profiles and has from two to four screw presses which are disposed above one another in a vertical plane. The presses jointly convey the various mixtures into the extrusion head. Such an extrusion apparatus is used, for example, in the tires manufacturing industry when unvulcanised tread strips or side walls for vehicle tires are to be produced in a single operation from a plurality of rubber mixtures having different properties of wear resistance, flexibility and/or colouration. In such an extrusion apparatus, the extrusion head comprises a plurality of component parts. Since extremely high pressures occur within the extrusion head, appropriate locking arrangements must be provided.

Such locking is effected by means of trapezoidal wedges which are hydraulically displaceable from each end of the upper and lower head portions. The wedges engage in rectangular apertures formed in lateral portions of the head. This locking arrangement serves to prevent rubber from emerging from the butt joints between the head portions.

The pressure of the material in such extrusion heads may be as high as 300 bars. In other words, pressures of up to 600 t may act on the respective inner surfaces of the upper head portion and fixed central head portion. Because of these high pressures, it is extremely difficult to ensure that the joints of an extrusion head are sealed.

A locking system, of the type described in German Patent Specification No. 3 212 157, is suitable for use in extrusion heads which operate at very low pressures.

When the head is to be closed, that is to say, moved into its inoperative position, the upper head portion and the lower head portion are both displaced towards the fixed central head portion. Subsequently, the wedge-shaped locking members are hydraulically displaced outwardly at each end of the pivotable head portions into rectangular apertures formed in the lateral portions of the head. The locking wedges are forced into the apertures as far as possible, the depth of insertion being dependent upon the frictional forces between the wedges and the apertures. Consequently, due to the wedge effect, a strong closure force is produced.

When the mass pressure in the flow channels exceeds a certain value, approximately 200 bars, however, material emerges from the joints between the head portions, with the result that the operation of the extrusion head is considerably impaired.

An increase in the locking force, or more intensive pressing of the head portions towards one another, during the operation is not possible. This is because, using a wedge-type locking arrangement, the wedges cannot be displaced any further into the rectangular apertures in the lateral head portions due to the fact that the frictional forces increase with increasing mass pressure. In consequence, the position of the wedges in the apertures formed in the lateral head portions cannot be changed in the event of an increase in mass pressure in the flow channels. Hence, if a predetermined mass pressure is exceeded, further sealing of the head portions is not possible.

OBJECT OF THE INVENTION

The present invention seeks to provide an extrusion head suitable for producing tread strips for motor vehicle tires formed from a number of rubber mixtures in which the extrusion head is sealed from extremely high mass pressures in the respective flow channels in a simple manner.

SUMMARY OF THE INVENTION

According to the present invention, there is provided an extrusion head suitable for producing tread strips for automotive vehicle tires from a plurality of rubber mixtures comprising a fixed central head portion and pivotable upper and lower head portions disposed one on each side of the central head portion, at least two flow channels being defined in said head between said central portion and, respectively, said upper and lower portions, the flow channels being disposed above one another in a vertical plane, the upper and lower head portions each being pivotable with respect to the central head portion by hydraulically actuated means, locking means which are hydraulically actuated and which are mounted on each side of each of the pivotable head portions so as to be displaceable laterally outwardly in a direction substantially at right angles to the direction of flow of the mixtures through the extrusion head to engage in lateral portions of the upper and lower head portions and a locking arrangement for high-pressure locking of the upper and lower head portions; wherein the locking means comprises locking members mounted on each side of the pivotable head portions which are cylindrical and are displaceable into corresponding recesses formed in tensioning link members forming part of the hydraulically actuated locking arrangements, and wherein the hydraulically actuated locking systems, disposed on each side of the head for the locking of the upper head portion and lower head portion are pivotally mounted about a common pivot point.

The cylindrical locking members, which are provided on each side of the pivotable head portions, are displaceable at right angles to the direction of flow of the mixtures through the head and engage in recesses formed in tensioning link members of a hydraulic locking system. A high tensile force is then exerted on the locking members by means of hydraulic piston and cylinder arrangements. In consequence, it is possible to achieve optimum sealing pressures in a stepless manner.

The construction is considerably simplified by the provision of a common pivot point for both locking systems, that is to say, the locking system for the upper head portion and that for the lower head portion. In addition, the costs incurred and the required space for a second mounting point for the locking system or for a hydraulic cylinder are obviated.

Preferably, the locking members are in the form of solid cylinders which are secured to the piston rods of hydraulic piston and cylinder arrangements.

Desirably, the hydraulic locking system comprises hydraulically actuated piston and cylinder arrangements acting on substantially triangular spacer members having a common pivot point, the spacer members being pivotally connected to the tensioning link members.

In such an embodiment, hydraulic piston and cylinder arrangements, acting as tensioning members, engage with the spacer members adjacent one apex of the latter. The common pivot point for the two locking systems is provided adjacent another apex of the spacer members whilst the individual pivot axes for the tensioning link members are provided adjacent the third apex.

Because of the tensioning effect of the hydraulic piston and cylinder arrangement, a force transmitted by the locking system acts on the tensioning link member and is thence transmitted to the appropriate head portion through the intermediary of the cylindrical locking member.

It is particularly advantageous to provide a common pivot point for the locking systems for both the upper and lower head portions substantially at the point of intersection of the mass return pressure forces resulting from both inner surfaces, which forces originate from the inner surface of the upper head portion and from the inner surface of the lower head portion, because a pivot point which is balanced in respect of forces acting thereon is thus provided. Hence, the pivot point which absorbs a high closing force, is situated at the point of intersection of the mass return pressure force originating from the inner surfaces of the head, whereby uniform stresses are achieved by the high forces in the head.

The direction of the force, that is to say, the direction of the mass return pressure force, proceeding from the planar inner surface of, for example, the upper head portion, subtends a right angle with the inner surface of that head portion. The point of rotation and retention for the locking systems is fixed at the point of intersection of the directions of forces from the inner surfaces of the upper and lower head portions, whereby a statically balanced point for the absorption of maximum forces is achieved.

BRIEF DESCRIPTION OF THE DRAWINGS

Embodiments of the present invention will be further described, by way of example, with reference to the accompanying drawings, in which.

DESCRIPTION OF PREFERRED EMBODIMENTS

Figure 1:
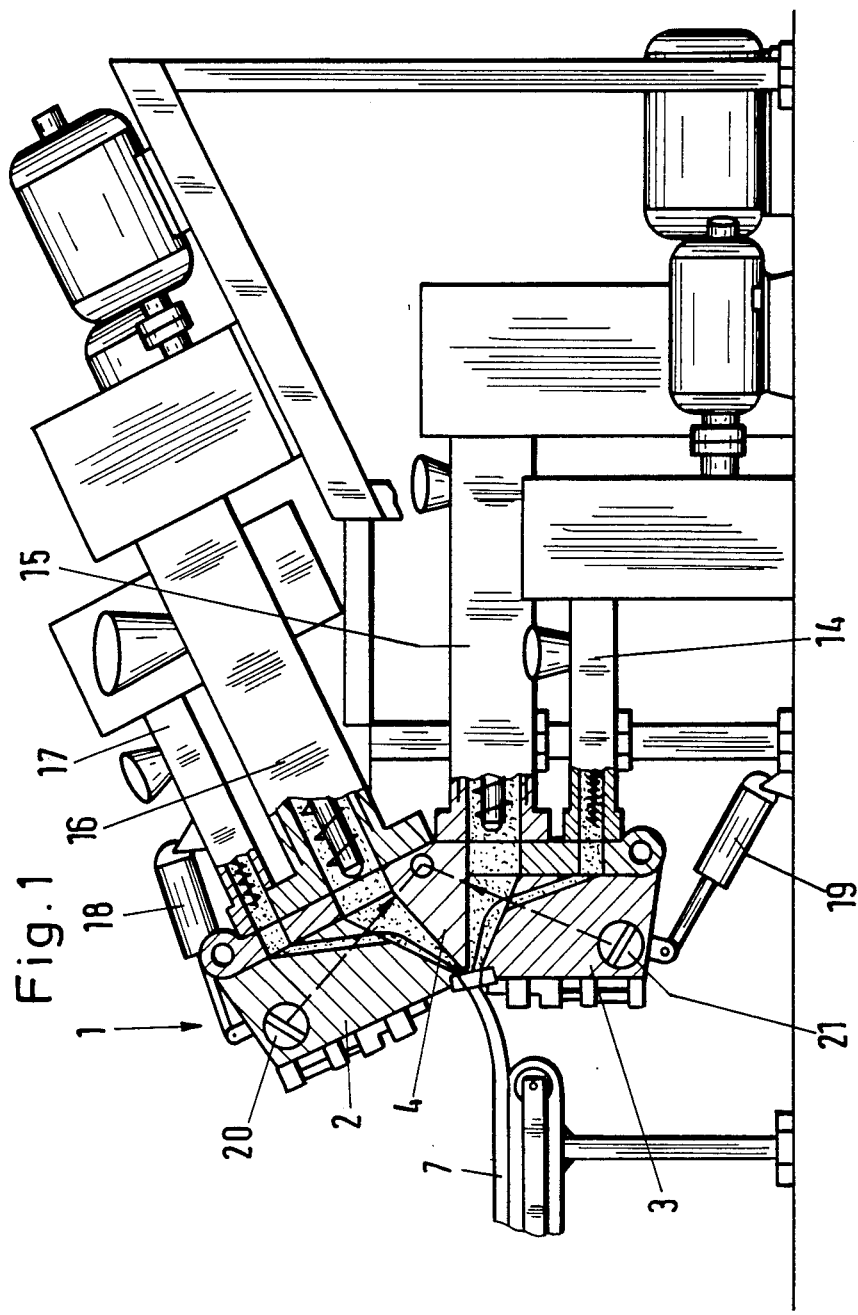
FIG. 1 is a longitudinal sectional view through an extrusion apparatus for use in the production of tread strips for vehicles, the apparatus including an extrusion head in accordance with the present invention, which head is shown in its closed state.
Figure 2:
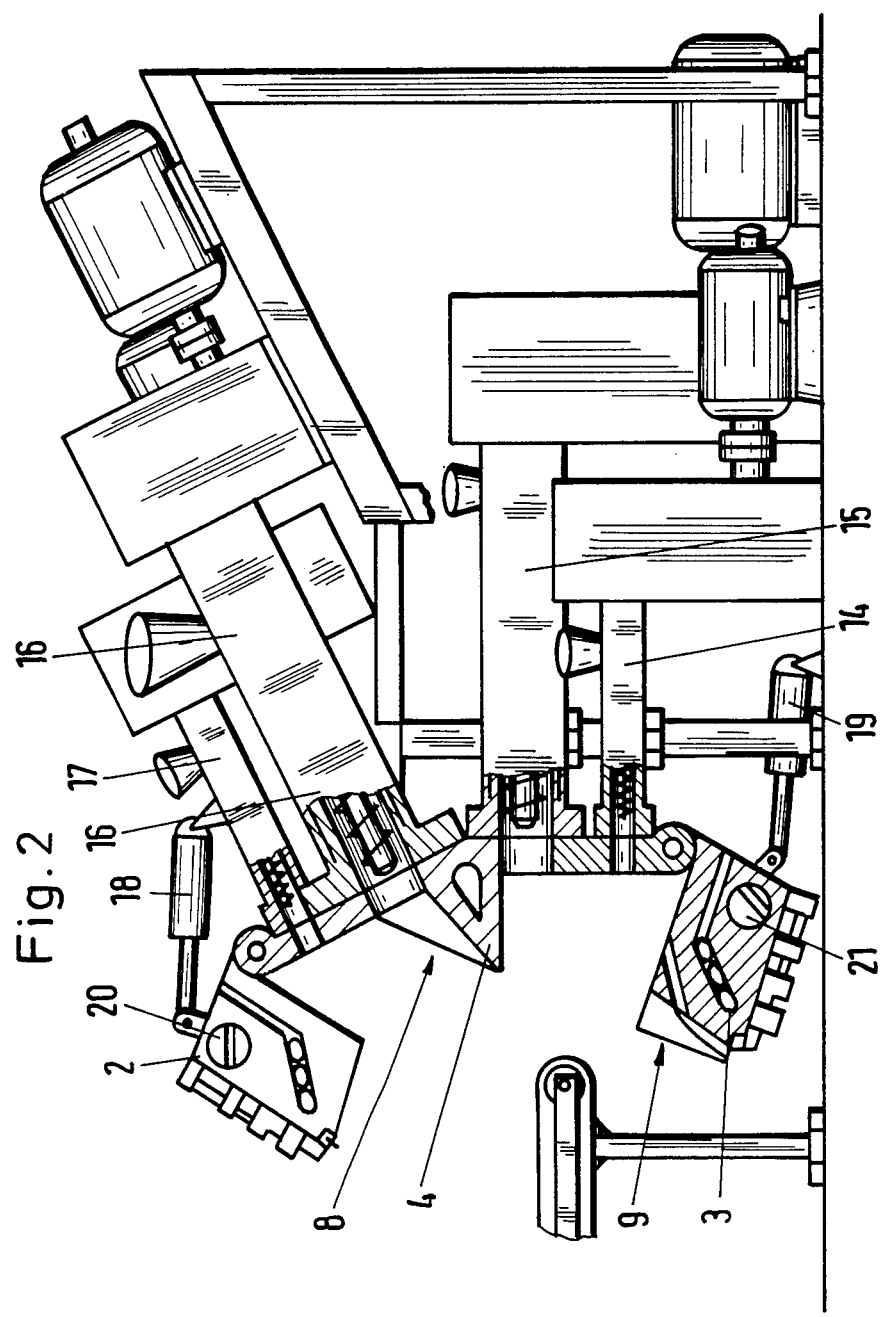
FIG. 2 illustrates a further embodiment of an extrusion apparatus which is generally similar to that shown in FIG. 1 but which shows the extrusion head in its pivoted-open state.

In both FIG. 1 and FIG. 2, there is shown an extrusion apparatus which comprises four extruders 14, 15, 16 and 17, disposed vertically above one another. Each extruder 14, 15, 16 and 17 is flange-mounted on an extrusion head 1.

In order to produce a tread strip for a motor vehicle from different rubber mixtures, the mixtures are fed into appropriate ones of the extruders 14, 15, 16 and 17, as shown in FIG. 1, and are extruded through a nozzle to form a tread strip 7 after they have been plasticised and homogenised.

The extrusion head 1 comprises a fixed central portion 4 and pivotable upper and lower portions 2 and 3 respectively. The portions 2 and 3 normally lie adjacent the central portion 4 but are pivotable away therefrom by means of hydraulic piston and cylinder arrangements. In the closed or pivoted-together state, the upper portion 2 and the lower portion 3 are held in place by means of an hydraulically-actuated locking arrangement 20 and 21 respectively.

FIG. 2 illustrates an extrusion apparatus basically similar to that shown in FIG. 1. However, in this Figure, the extrusion head is shown in its pivoted-open state. In addition, the arrangement shown in this embodiment includes insert members 8 and 9 which, when the head is closed, are disposed between the upper head portion 2 and the central portion 4 and the lower head portion 3 and the central portion 4 respectively. The insert members 8, 9 define flow channels for the mixtures being extruded.

If it is desired to change the mixtures being extruded, the insert members 8 and 9 have to be replaced. This may, for example, be necessary if a different profile is to be extruded. It is also necessary to remove the insert members to effect cleaning. To achieve this, the head 1 is pivoted open by means of hydraulic piston and cylinder arrangements 18 and 19, and the insert members 8 and 9 are released from their locking members (not shown). By doing this, the removal of the screws from the individual extruders 14, 15 and 16 for cleaning purposes is made possible.

Figure 3:
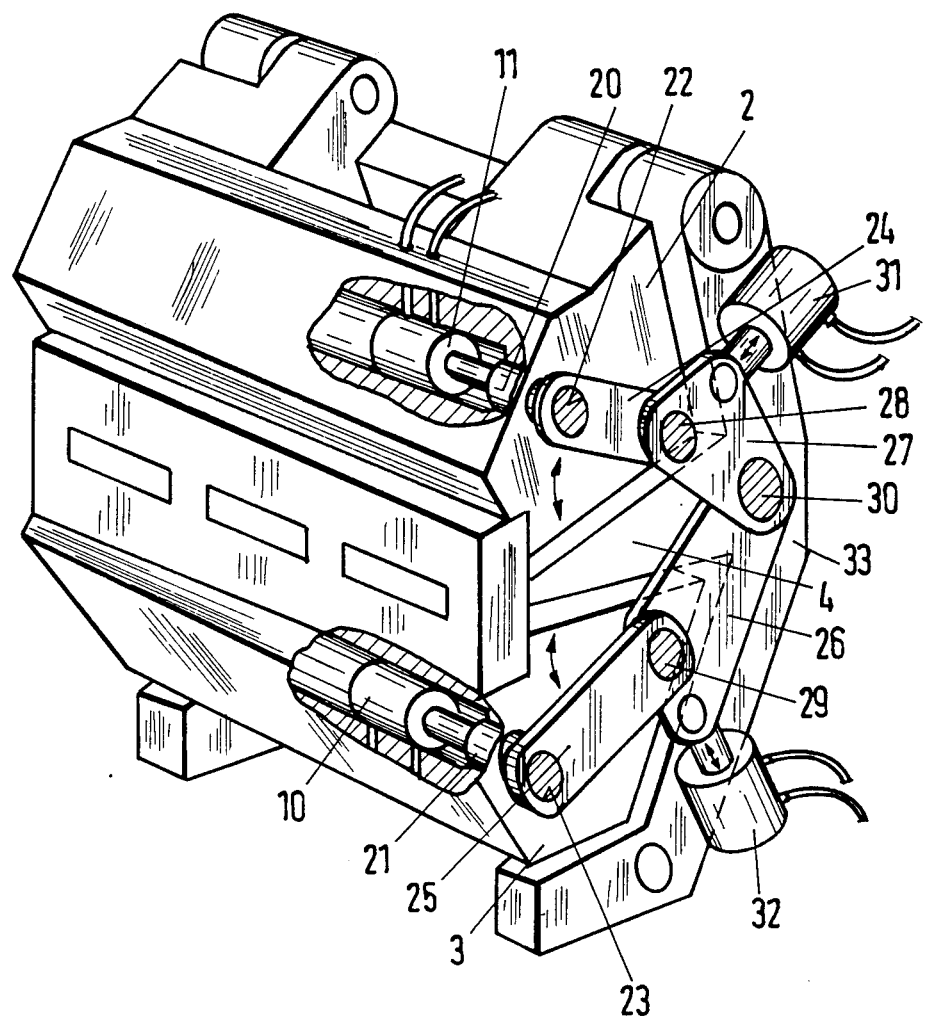
FIG. 3 is a perspective view of an extrusion head in accordance with the present invention.

In order to seal the head portions 2, 3 and 4 effectively, even at a maximum working pressure, which may be as high as 300 bars, a locking arrangement as shown in FIG. 3 is provided.

After the head portions 2 and 3 have been displaced towards the central portion 4 by means of the hydraulic piston and cylinder arrangement 18 and 19, which arrangements have been omitted from FIG. 3 for reasons of clarity, locking is effected by utilising cylindrical locking members 20 and 21 which are displaced from each end of the two pivotal head portions 2 and 3 respectively. The locking members 20 and 21 engage in circular apertures 22 and 23 formed in tensioning link members 24 and 25 respectively. For reasons of clarity, the locking arrangements are only illustrated at one end of the head portions 2 and 3 in FIG. 3. The tensioning link member 24 is connected to a triangular spacer member 27 by means of a pivotal connection 28 and the link member 25 is connected to a spacer member 26 by means of a pivotal connection 29.

The two spacer members 26 and 27 have a common pivotal mounting 30 on the head portion 4. Hydraulic piston and cylinder arrangements 31 and 32 engage with the spacer members 27 and 26 respectively and, in turn, the cylinders of these arrangements are mounted on the head portion 4 by a support means (not shown).

The mode of operation of such an arrangement will now be described.

Assuming that the extrusion head 1 is in its pivoted-open position as shown in FIG. 2, the upper head portion 2 is lowered by means of the hydraulic piston and cylinder arrangement 18 into the position which it occupies in FIG. 1. The lower head portion 3 is similarly raised by means of the hydraulic piston and cylinder arrangement 19.

The outer head portions 2 and 3, which are thus pivoted towards one another and are already pressed against the central head portion 4 by a sealing force, are shown in the perspective view in FIG. 3. High-pressure sealing of the head portions 2 and 4 and 3 and 4 is now effected by an additional locking arrangement. This will be described solely with reference to the sealing of the upper head portion 2 with the central head portion 4 but it will be readily apparent that the sealing between the lower head portion 3 and the central head portion 4 is achieved in a similar manner.

Figure 4:
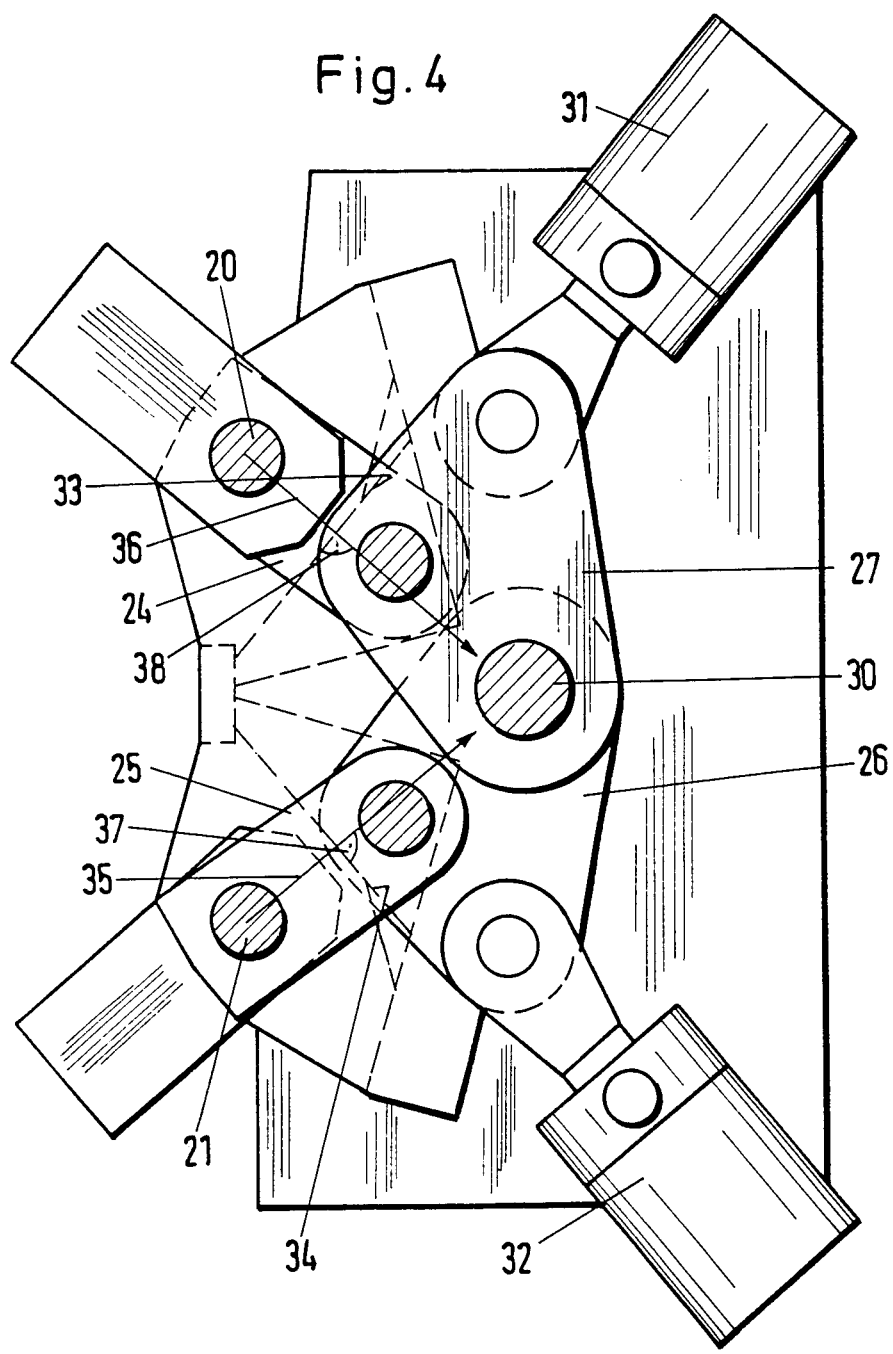
FIG. 4 is a view of part of locking systems forming part of the extrusion head of the present invention.

The cylindrical locking member 20 is displaced laterally outwardly from the upper portion 2 by means of the hydraulic piston and cylinder arrangement 11 and engages in the circular recess 22 formed in the tensioning arm 24. A force is subsequently exerted upon the triangular spacer member 27 by means of the hydraulic piston and cylinder arrangement 31, which is double-acting. This force is then transmitted to the tensioning link member 24 in an amplified manner and causes the link member 24 to be displaced towards the central head portion 4. The upper head portion 2 is thus forced towards the central head portion 4. Because the common pivot point 30 is located at the point of intersection of the resultant mass return pressure force lines 35 and 36 (FIG. 4) from the inner head surfaces, a balanced construction is achieved which absorbs extremely high forces without stressing the component parts.

We claim:

1. An extrusion head suitable for producing tread strips for automotive vehicle tires from a plurality of rubber mixtures comprising a central head portion, upper and lower head portions disposed one on each side of said central head portion, said upper head portion and said central head portion and said lower head portion and said central head portion jointly defining at least two flow channels therebetween through which said rubber mixture is directed toward an extrusion nozzle, said flow channels being disposed above one another in a vertical plane, hydraulic means for pivoting each of said upper and lower head portions relative to said central head portion, said upper and lower head portions each including lateral portions extending substantially parallel to the direction of flow of said rubber mixtures through said extrusion head, hydraulically actuated locking means mounted on each said lateral portion and displaceable laterally outwardly in a direction substantially at right angles to said direction of flow, said locking means including locking members engageable with each said lateral portion and a locking arrangement for high-pressure locking of said upper and lower head portions, wherein said locking members are cylindrical and said locking arrangement includes tensioning link members, each said tensioning link member defining a recess for receiving one of said cylindrical locking members, common pivot means for pivotally mounting said locking arrangement for said upper head portion and said locking arrangement for said lower head portion disposed on the same lateral side of said head, and wherein each of said locking arrangements includes substantially triangular spacer members, and means for mounting said spacer members on each lateral portion of said upper and lower head portions about said common pivot point means, and further including separate hydraulically actuated piston and cylinder arrangements acting on each of said spacer members, each spacer member being pivotally connected to one of said tensioning link members.

2. An extrusion head as recited in claim 1, wherein said locking members are solid cylinders and said hydraulic actuating means for actuating said locking members includes piston rods, said solid cylinders being secured to said piston rods.

3. An extrusion head as recited in claim 1, wherein each said upper and lower head portion each includes an inner surface disposed, in use, adjacent said central portion, and wherein mass return pressure forces emanate, in use, from said inner surfaces, said common pivot point means being disposed substantially at a point where said forces intersect.

4. An extrusion head as recited in claim 3, wherein the direction of said mass return pressure force emanating from one of said inner surfaces is substantially at right angles to the other inner surface.

* * * * *